Dec. 22, 1925.
J. A. THOMAS
1,566,999
AUTOMOBILE SPOTLIGHT
Filed Nov. 2, 1923
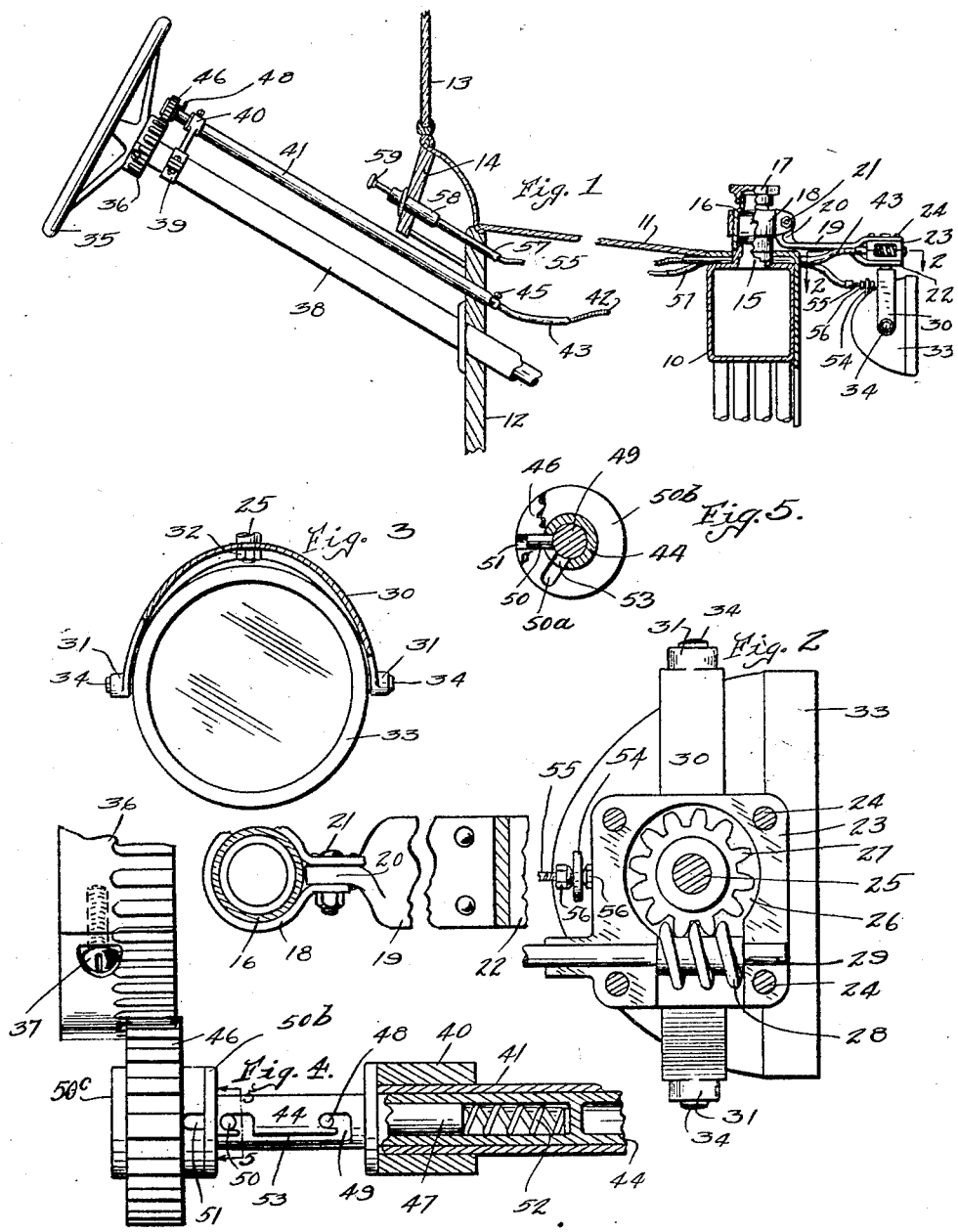
Inventor
James A. Thomas
by Bair & Freeman attys.

Patented Dec. 22, 1925.

1,566,999

UNITED STATES PATENT OFFICE.

JAMES ALFRED THOMAS, OF ALBERT LEA, MINNESOTA.

AUTOMOBILE SPOTLIGHT.

Application filed November 2, 1923. Serial No. 672,307.

*To all whom it may concern:*

Be it known that I, JAMES ALFRED THOMAS, a citizen of the United States, and a resident of Albert Lea, in the county of Freeborn and State of Minnesota, have invented a certain new and useful Automobile Spotlight, of which the following is a specification.

The object of my invention is to provide an automobile spot light adapted to be secured to the radiator spout of the automobile and capable of movement on a vertical axis in unison with the movement of the steerable wheels of the automobile, the parts being of simple, durable and comparatively inexpensive construction, whereby the device can be manufactured and marketed at a comparatively low cost.

More particularly, my invention relates to a spot light secured to the radiator spout of the automobile and capable of movement on a vertical axis and also on a horizontal axis, the light being operatively connected to the steering wheel of the automobile in such a manner that rotation of the steering wheel will impart like rotation to the spot light, and a means operatively connected with the light and operable from the dash of the automobile for swinging the light on a horizontal axis.

Still a further object is to provide a clutch arranged in the connection between the light and the steering wheel of the automobile, so that the light may be rendered inoperative, as during the day when it is not necessary, to swing the light on its vertical axis and is not necessary to have a light at all.

Still a further object is to so arrange the clutch that the parts will only engage at a predetermined place, so as to always insure the pilot light of being moved the proper amount and in the proper direction when the steering wheel is rotated.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a sectional view taken through a portion of the radiator and dash of an automobile with my improved spot light installed thereon, parts being broken away to better illustrate the construction.

Figure 2 is a sectional view taken on the line 2—2 of Figure 1, showing the gear connections for rotating the light on a vertical axis.

Figure 3 is a front view of the spot light showing the yoke for connecting the same to the vertical shaft and also showing the trunnions upon which the light is swung on a horizontal axis; and Figure 4 is a detail, sectional view of the clutch used for rendering the light inoperative.

Figure 5 is a sectional view on the lines 5—5 of Figure 4.

In the accompanying drawings, I have used the reference numeral 10 to indicate generally the radiator of an automobile and 11 the hood thereof.

The dash 12 as well as a windshield 13 form a part of the construction of the automobile.

The automobile also includes an instrument board 14.

The radiator 10 is provided with a spout 15 upon which I mount a thimble or fitting 16. The cap 17 which is ordinarily extended over the spout 15 screws over the thimble 16. The purpose of the thimble 16 is to add sufficiently to the length of the spout so that the clamp 18 of my device can be extended therearound and secured thereto.

A bracket 19 extends forwardly from the radiator spout and is provided with a portion 20 received between the ends of the clamping member 18 and is secured thereto by means of a bolt 21.

The bracket 19 has a second piece 22 secured thereto and spaced from the outer end of the bracket 19 so that the piece 22 and the outer end of the bracket 19 form a pair of spaced jaws for receiving a gear casing 23. The gear casing 23 is formed of two halves held together by machine screws 24. The machine screws 24 extend through the pair of jaws and also through the gear casing 23 for holding the parts in proper connection.

A vertical shaft 25 is mounted within the gear casing and extends through the piece 22. The gear casing 23 is formed with an opening 26 in its center for receiving a worm wheel 27. The worm wheel 27 is fixed to the shaft 25 and is in mesh with a worm 28. The worm 28 is mounted upon a shaft 29 having its bearings formed in the gear casing 23.

Secured to the lower end of the vertical shaft 25 is a yoke 30 having enlarged bearings 31 on its ends. The yoke 30 is secured to the shaft 25 by means of a nut 32 screwed onto a portion of the shaft 25 as clearly shown in Figure 3 of the drawings.

A spot light 33 of the ordinary type of lights used for automobiles is received between the ends of the yoke 30 and secured thereto by the trunnions 34 which extend into the bearings 31.

From the construction of the parts just described, it will be seen that the spot light 33 is capable of swinging movement on a horizontal axis.

It will also be seen that when the vertical shaft 25 is rotated, it will swing the yoke 30 carrying with it the spot light 33. In order to operate the pilot light, so that it can be either moved upon a vertical axis or upon a horizontal axis, I provide the following described means:

Secured to the steering wheel 35 of the automobile is a split gear structure 36. The parts of the split gear structure 36 are held together by the screws 37. It is necessary to use a split gear for mounting the same on the steering wheel hub.

Mounted upon the steering wheel post 38 is a bracket 39, which has a bearing 40 on its free end in which is mounted a tube 41. The tube 41 has one end extended through an opening formed in the dash 12 so that the bearing 40 and the dash 12 serve as the means for supporting the tube 41 in the proper position.

A flexible shaft 42 is mounted in the tube 41 and is also mounted in a small cover tube 43. The flexible shaft 42 extends above the radiator 10 and below the shield thereof near the spout 15.

One end of the flexible shaft 42 is fixed to the shaft 29.

Mounted within the tube 41 is a hollow shaft 44 to which is fixed the flexible shaft 42 by means of a set screw or the like 45. Mounted upon the upper free end of the shaft 44 is a gear 46 arranged to be permanently in mesh with the split gear structure 36. The gear 46 is loosely mounted on the hollow shaft 44 between collars 50$^b$ and 50$^c$. The collars 50$^b$ and 50$^c$ are soldered, welded or otherwise secured to the shaft 44 for the purpose of positioning the gear 46 longitudinally thereon.

A clutch structure is provided for engaging or disengaging the shaft 44 from the gear 46. The clutch structure includes a plunger 47 having an operating pin 48 secured thereto. The pin 48 extends through a bayonet slot 49 formed in the shaft 44. A short pin 50 is also fixed to the plunger 47 and is designed to pass through an opening 50$^a$ of the collar 50$^b$, and be received in a notch 51 formed in the hub of the gear 46.

When the short pin 50 is in engagement with the notch 51, then the shaft 44 and the gear 46 will be operatively connected together.

A spring 52 mounted within the shaft 44 yieldingly holds the plunger at one limit of its movement.

In Figure 4 of the drawings, I have shown the clutch structure as disengaged from the gear 46.

When it is desired to cause the parts to engage, then it is necessary to engage the pin 48 moving it downwardly and against the action of the spring 52 until it clears the bayonet slot, and by rotating it a small amount, it will be permitted to slide in the slot 53.

The short pin 50 will move with the pin 48 and when it passes through the opening 50$^a$, it will be held against the hub of the gear 46 by the spring 52. When the gears 36 and 46 are rotated, by steering, until the notch 51 is in alignment with the pin 50, the spring 52 will cause the pin 50 to engage the notch 51, thereby operatively connecting the parts.

It will be seen that when the steering wheel 35 is rotated, it will impart rotation to the flexible shaft 42, which in turn will operate the worm 28 for rotating the worm wheel 27. The clutch structure is so arranged that it will only engage the gear 46 at one particular point, so as to always insure the operation of the spot light on a vertical axis in unison with the steering wheel 35 or the steerable wheels of the automobile.

Fixed to the light 33 is a short lug 54 through which is extended a flexible shaft 55. Nuts 56 are mounted on the flexible shaft on each side of the lug 54. The nuts 56 are so arranged as to provide a loose connection between the shaft 55 and the light 33.

The shaft 55 is received in a cover tube 57, which extends through the dash 12 and into a fitting 58 mounted on the instrument board 14.

A rigid shaft 59 is suitably connected to the shaft 55 so that when it is desired to swing the light 33 on a horizontal axis, all that is necessary is to engage the shaft 59 and push it forwardly or pull it rearwardly as is desired.

The movement of the shaft 59 in the fitting 58 will cause the light 33 to be swung on a horizontal axis.

It will thus be seen that I have provided a spot light which can be operated either on a vertical axis or on a horizontal axis as desired, the operation on a vertical axis being automatic due to the fact that it is operated when the steering wheel of the automobile is operated.

The worm wheel 27 and worm 28 form such a connection as will prevent the spot light from freely rotating on its vertical axis when the steering wheel is not rotated.

The shaft 59 is frictionally engaged with the fitting 58 and will retain the light 33 against swinging horizontal movement on a horizontal axis, unless the shaft 59 is manually operated in either direction.

One advantage of having a spot light for an automobile is that when turning around a corner, the light moves in unison with the steerable wheels and gives light on the road where it is most desired.

My spot light is to be used with the ordinary headlights on an automobile.

Some changes may be made in the arrangement and construction of the various parts of my automobile spot light without departing from the essential features and purposes of my invention, and it is my intention to cover by my claims, any modified forms of structure or use of mechanical equivalents, which may be reasonably included within their scope.

I claim as my invention:

1. A spot light provided with supporting means to be clamped to and supported from the filler spout of the radiator of an automobile, said spot light rotatably mounted in position under said support and operatively connected to one end of a flexible shaft, a shaft attached at one of its ends to the other end of said flexible shaft, and supported in position parallel to the steering column of the automobile, a gear loosely mounted on the upper end of said shaft in mesh with a gear secured to the steering wheel of the automobile, said upper end of said shaft being hollow and having a plunger therein, a spring back of said plunger, pins on said plunger adapted to rest in notches in said shaft in inoperative position and arranged so that one of said pins will be in a slot in said shaft, and the other of said pins will be in a notch in said loosely mounted gear when the device is in operative position.

2. A spot light provided with supporting means to be clamped to and supported from the filler spout of the radiator of an automobile, said spot light rotatably mounted in position under said support and operatively connected to one end of a flexible shaft, said connection comprising a worm gear and worm shaft attached at one of its ends to the other end of said flexible shaft, and supported in position parallel to the steering column of the automobile, a gear loosely mounted on the upper end of said shaft is mesh with a gear secured to the steering wheel of the automobile, said upper end of said shaft being hollow and having a plunger therein, a spring back of said plunger, pins on said plunger adapted to rest in notches in said shaft in inoperative position and arranged so that one of said pins will be in a slot in said shaft, and the other of said pins will be in a notch in said loosely mounted gear when the device is in operative position.

3. A spot light provided with supporting means to be clamped to and supported from the filler spout of the radiator of an automobile, said spot light rotatably and tiltably mounted in position under said support and operatively connected to one end of a flexible shaft, a shaft attached at one of its ends to the other end of said flexible shaft and supported in position parallel to the steering column of the automobile, a gear loosely mounted on the upper end of said shaft in mesh with a gear secured to the steering wheel of the automobile, said upper end of said shaft being hollow and having a plunger therein, a spring back of said plunger, pins on said plunger adapted to rest in notches in said shaft in inoperative position and arranged so that one of said pins will be in a slot in said shaft and the other of said pins will be in a notch in said loosely mounted gear when the device is in operative position, a lug on said spot light, a flexible wire connected at one of its ends to said lug and a plunger having a knob connected to its other end and mounted on the dash of said automobile whereby movement of the plunger will cause said spot light to tilt.

4. A spot light provided with supporting means to be clamped to and supported from the filler spout of the radiator of an automobile, said spot light rotatably and tiltably mounted in position under said support and operatively connected to one end of a flexible shaft, said connection comprising a worm gear and worm shaft attached at one of its ends to the other end of said flexible shaft and supported in position parallel to the steering column of the automobile, a gear loosely mounted on the upper end of said shaft in mesh with a gear secured to the steering wheel of the automobile, said upper end of said shaft being hollow and having a plunger therein, a spring back of said plunger, pins on said plunger adapted to rest in notches in said shaft in inoperative position and arranged so that one of said pins will be in a slot in said shaft and the other of said pins will be in a notch in said loosely mounted gear when the device is in operative position, a lug on said spot light, a flexible wire connected at one of its ends to said lug and a plunger having a knob connected to its other end and mounted on the dash of said automobile whereby movement of the plunger will cause said spot light to tilt, the rotating and tilting movements of said spot light being independent of each other.

Des Moines, Iowa, October 24, 1923.

JAMES ALFRED THOMAS.